UNITED STATES PATENT OFFICE.

CARL FREDERICI, OF NEW YORK, N. Y.

IMPROVEMENT IN PROCESSES OF MANUFACTURING SHEETS OF WAX.

Specification forming part of Letters Patent No. 154,034, dated August 11, 1874; application filed November 17, 1873.

CASE C.

*To all whom it may concern:*

Be it known that I, CARL FREDERICI, of the city, county, and State of New York, have invented a new and Improved Process for the Manufacture of Sheets of Wax; and I do hereby declare the following to be a full, clear, and exact description thereof, which will enable those skilled in the art to make and use the same.

This invention consists in a process or method of producing sheets of bees-wax by means of a plate of glass or other suitable material, which, after having been coated on one or both sides with whiting or some suitable pigment or substance, or otherwise suitably prepared, is dipped in molten bees-wax, whereby a film or layer of wax is caused to adhere to such prepared side or sides of the pane or plate of glass, so that by stripping off these films or layers, the desired sheets of wax are produced.

In carrying out my invention, I take a pane of glass, or a sheet of any other suitable material, and cover it, preferably on both sides, with a thin coating of whiting, or any suitable pigment or substance which will prevent the adhesion to it of the molten wax, and at the same time permit of the ready separation from the plate of glass or other material of the wax when cold, as will be presently described.

Whiting or paint may be applied in a dry state or mixed with water.

After the plate or sheet has been properly prepared, I dip the same in molten wax, removing it quickly. After the plate or sheet has been removed from the molten wax it is found that a thin layer of wax has adhered to each of its sides, and by stripping these layers from the pane or plate, the required sheets of wax are obtained.

The thickness of the sheets of wax to be produced can be regulated by increasing or decreasing the temperature of the molten wax, which necessarily increases or decreases its liquescency, and therefore produces a thinner or thicker layer or film of wax. The desired thickness may, however, be also produced by more than one dipping.

I can accomplish the above-stated results by taking a piece or pane of glass ground on one or both of its sides and simply damping with a sponge, and then dipping the plate or pane in the molten wax. The wax will adhere to the ground or roughened surface, and at the same time be easily separable from it when cold, so as to produce smooth and even sheets of wax.

I am aware that wax has been melted and cast in sheets. I am also aware that sheets of wax have been produced by cutting the wax in veneers by proper cutting-knives. I am also aware that articles have been cast of wax by dipping them in molten wax, such as doll-heads; but I am not aware that sheets of wax have been produced in the manner and for the purposes above described.

What I claim as new, and desire to secure by Letters Patent, is—

The within-described process of producing sheets of wax by means of a plate or sheet of glass or other suitable material, which, after having been provided with a protecting coat of whiting or any other suitable material, is dipped into molten wax, and then removing the film or layer of wax therefrom, substantially as set forth.

CARL FREDERICI.

Witnesses:
W. HAUFF,
E. F. KASTENHUBER.